United States Patent
Perske et al.

(10) Patent No.: US 6,568,761 B2
(45) Date of Patent: May 27, 2003

(54) BACKREST OF A MOTOR VEHICLE SEAT

(75) Inventors: Joachim Perske, Salzkotten (DE); Jens Bendler, Paderborn (DE); Andreas Stosch, Salzkotten (DE); Andreas Plass, Bielefeld (DE); Frans Stevens, Pt Biezenmodel (NL)

(73) Assignees: Benteler AG, Paderborn (DE); ContiTech Formpolster, Löhne (DE); dumo nv, Goirle (NL)

( * ) Notice: Subject to any disclaimer, the term of this patent is extended or adjusted under 35 U.S.C. 154(b) by 1 day.

(21) Appl. No.: 09/948,140

(22) Filed: Sep. 6, 2001

(65) Prior Publication Data

US 2002/0074845 A1 Jun. 20, 2002

(30) Foreign Application Priority Data

Sep. 6, 2000 (EP) .............................. 00119248

(51) Int. Cl.⁷ .............................................. A47C 31/02
(52) U.S. Cl. ................. 297/452.6; 297/452.55
(58) Field of Search ........................ 297/218.1, 218.5, 297/452.55, 452.6

(56) References Cited

U.S. PATENT DOCUMENTS

| | | | | |
|---|---|---|---|---|
| 3,630,572 A | * | 12/1971 | Homier | 297/452.6 |
| 3,794,378 A | * | 2/1974 | Haslam et al. | 297/452.6 |
| 4,691,963 A | * | 9/1987 | Mikuniya et al. | 297/452.6 |
| 4,871,209 A | * | 10/1989 | Handelman | 297/452.55 |
| 5,522,645 A | * | 6/1996 | Dahlbacka | 297/452.55 |
| 5,964,017 A | * | 10/1999 | Roberts | 297/452.59 |
| 6,048,025 A | * | 4/2000 | Tillner | 297/218.1 |
| 6,439,666 B1 | * | 8/2002 | Kimura et al. | 297/452.55 |

* cited by examiner

Primary Examiner—Peter R. Brown
(74) Attorney, Agent, or Firm—Friedrich Kueffner

(57) ABSTRACT

A backrest of a motor vehicle seat has a sheet metal shell having several cutouts and an upholstery member arranged on the sheet metal shell. The upholstery member has securing elements for attaching the upholstery member to the sheet metal shell. Each securing element has a fastening leg secured in one of the cutouts of the sheet metal shell. Each one of the securing elements has a hook portion positioned opposite the fastening leg and engaging the upholstery member. An upholstery cover covers the upholstery member and has connectors each connected to one of the securing elements.

11 Claims, 1 Drawing Sheet

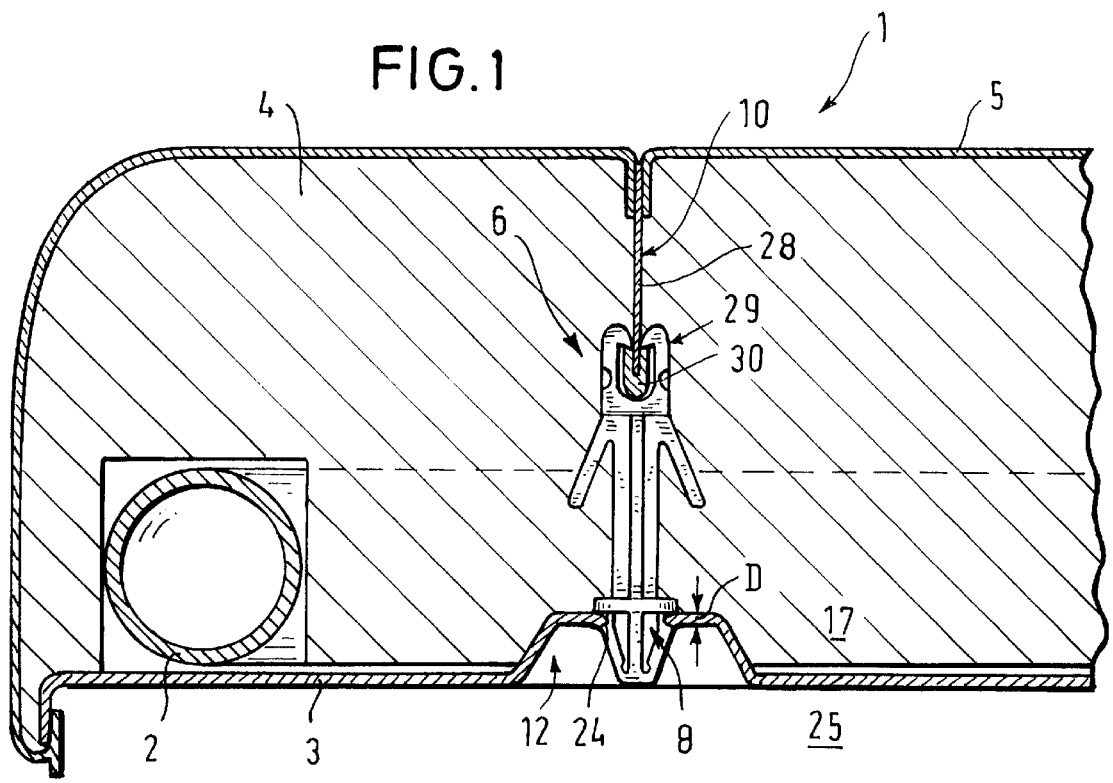
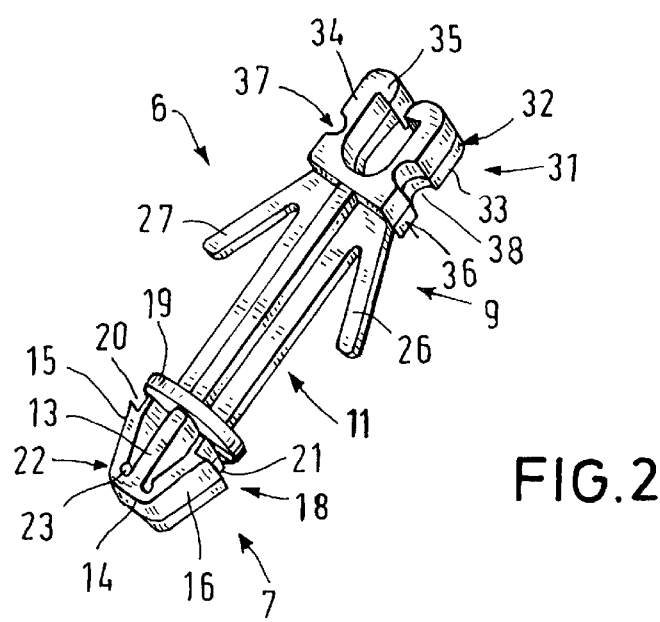

BACKREST OF A MOTOR VEHICLE SEAT

BACKGROUND OF THE INVENTION

1. Field of the Invention

The invention relates to a backrest as a component of a motor vehicle seat which is comprised of a sheet metal shell and an upholstery member with an upholstery cover arranged thereon.

2. Description of the Related Art

In backrests of motor vehicle seats of known design, sheet metal shells which are reinforced by a tube frame are used in conjunction with upholstery members comprising an attached foam material in which so-called fabric catch wires are inserted. In the upholstery cover fabric loops are sewn in which must be threaded into the upholstery wires which are provided with eyes at their ends. When connecting the upholstery member, these eyes are suspended from the fabric catch wires which are present within the foam material. This provides a connection between the upholstery member and the upholstery cover. Subsequently, the outer edges of the upholstery cover are connected by means of piping with the sheet metal shell. Accordingly, in the seat area there is thus no connection between the upholstery cover and the sheet metal shell.

SUMMARY OF THE INVENTION

It is an object of the present invention to provide a backrest which, for the same construction space, provides a stiffer upholstery member and is furthermore advantageous with regard to manufacturing technological aspects.

In accordance with the present invention, this is achieved in that the upholstery member is fixed by securing elements on the sheet metal shell wherein each securing element is secured by a fastening leg in a cutout of the sheet metal shell and engages with a hook portion in the upholstery member, and the upholstery cover is coupled by a connector with the securing element.

The gist of the invention resides in the feature that the upholstery member is fixed by securing elements on the sheet metal shell wherein each securing element is attached with a fastening leg in a cutout of the sheet metal shell and penetrates with a hook portion into the upholstery member. The upholstery member is coupled by a connector to the securing element.

This results in a direct coupling of the upholstery cover and the sheet metal shell. The invention makes it possible to connect the upholstery member much faster to the sheet metal shell of the backrest and also allows the use of thicker foam materials as an upholstery member. This can provide a stiffer upholstery member within the same construction space.

The required cutouts are provided in the sheet metal shell of the backrest in defined positions. This can be done during the course of shaping of the shell or also in a further manufacturing step. The securing elements are inserted into these preferably quadrangular cutouts. The securing elements are expediently made of plastic material. Onto these the tailored foam part can be placed as an upholstery member. The upholstery member is now secured in its position for transport. The attachment or position orientation is ensured by the hook portions. Logistically, this is advantageous because the intermediate component can be delivered to the upholstery company in this state. At the upholstery company, the backrest is then covered by the upholstery cover wherein a coupling between the upholstery cover and the securing element is provided by a connector.

In this way, a direct connection between the upholstery cover and the sheet metal shell is ensured. With this measure, thicker upholstery materials or tighter upholstery members can be provided for the same amount of construction or mounting space. Moreover, the backrest is improved with regard to quality as well as with regard to its service life.

According to a preferred embodiment of the present invention, each cutout provided for the securing elements is arranged in a recess of the sheet metal shell that is set back in the direction toward the upholstery member. The fastening leg then does not project past the backside of the sheet metal shell. Also, it is possible to introduce the fingers into the recess to manually grip the fastening leg in order to detach the fastening leg and to demount a securing element.

The fastening leg according to a preferred embodiment of the invention has two spring-elastic spreading legs and an abutment positioned opposite the free ends of the spreading legs at a spacing matching the thickness of the sheet metal shell. A securing element can then snap with its clip-shaped fastening leg into the cutout without greater expenditure by simply being inserted and is then secured in its position. The spreading legs press against the sheet metal shell. On the inwardly positioned side of the sheet metal shell, the securing element is supported by its abutment.

Advantageously, at the free ends of the spreading legs recesses are provided which face away from one another. With these recesses the spreading legs are positioned at the surrounding sheet metal wall of the cutout.

According to another preferred embodiment of the invention, the hook portion has at least one barb positioned at an angle relative toward the sheet metal shell. The one or more barbs can be designed differently. They ensure a reliable securing action of the upholstery member during transport. Moreover, slipping of the upholstery member on the sheet metal shell underneath the upholstery cover is prevented in the finished backrest.

For producing a coupling between the connector and the securing element, according to a preferred embodiment of the invention the securing element has at a side opposite the fastening leg a receptacle engaged by the connector with its securing profile.

Even though constructively different designs of the receptacle are possible, an advantageous embodiment of the invention has a pocket-like design and is provided with two snap legs with securing pawls at their ends. Each snap leg is provided at its outer side with a recess extending transversely to the longitudinal extension of the snap legs and having a stay arrange approximately in the central area. With this, spring-elastic securing properties of the snap legs are enhanced in a positive way.

According to another preferred embodiment, the connector is comprised of a non-woven thread with an injectionmolded pointed securing profile. The fabric loops which have been provided on upholstery covers of the prior art are replaced according to the invention by the connector of non-woven material with pointed securing profile. With the securing profile the connector is pressed into the receptacle of the securing element. In this connection, the snap legs engage with their securing pawls the securing profile. This results in a direct connection of the upholstery cover on the sheet metal shell via the connector and the securing element.

A further advantageous embodiment of the present invention is characterized in that the securing element has a central portion with a cross-shaped cross-section. The cross-shaped cross-section enhances the strength and increases the breakage resistance of the securing element.

BRIEF DESCRIPTION OF THE DRAWING

In the drawing:

FIG. 1 shows a portion of a backrest of a motor vehicle seat in cross-section; and FIG. 2 is a securing element according to the invention in a perspective illustration.

DESCRIPTION OF THE PREFERRED EMBODIMENTS

FIG. 1 shows a portion of the backrest 1 for a motor vehicle seat. The backrest 1 has a sheet metal shell 3 which is secured on a tubular frame 2 with an upholstery member 4 attached thereto which is comprised of a tailored foam material. An upholstery cover 5 is placed onto the upholstery member 4.

The upholstery member 4 is secured by several securing elements 6 which are distributed across the sheet metal shell 3. Such a securing element is illustrated in detail in FIG. 2.

A securing element 6 has a fastening leg 7 which is secured within a cutout 8 of the sheet metal shell 3. By means of a hook portion 9 the securing element 6 engages the upholstery member 4. The upholstery cover 5 is coupled by a connector 10 to the securing element 6. The center portion 11 of the securing elements 6 has a cross-shaped cross-section.

The cutout 8 is designed as a quadrangular hole which is arranged in a depression or recess 12 set back in the direction toward the upholstery member 4. The fastening leg 7 is inserted into the quadrangular hole. The fastening leg 7 has a center stay 13 with a T-shaped widened foot portion 14 with two spring-elastic spreading legs 15, 16 adjoining the foot portion 14 on both sides. At the inner side 17 of the sheet metal shell 3 opposite the free ends 18 of the spreading legs 15, 16, the fastening leg 7 has an abutment 19 in the form of a plate which adjoins the center portion 11 and is positioned at a spacing corresponding to the thickness D of the sheet metal shell 3 from the free ends 18. At the free ends 18 of the spreading legs 15, 16 transverse recesses 20, 21 are provided which are facing away from one another.

The fastening leg 7 can be secured by a snap connection in the cutout 8. When doing so, the fastening leg 7 is guided from the inner side 17 of the sheet metal shell 3 through the cutout 8. The spreading legs 15, 16 are compressed during insertion. One can see that at the end 22 facing the foot of the spreading legs 15, 16 a substantially circular recess 23 is provided at the transition to the central stay 13. The recess 23 extends across the width of the central stay 13 and of the spreading legs 15, 16. This prevents material squeezing during compression of the spreading legs 15, 16. As soon as the spreading legs 15, 16 have passed through the cutout 8, they will again spread apart as a result of their spring force. They are then supported by means of the recesses 20, 21 at the neighboring walls 24 of the cutout 8.

In cooperation with the abutment 19 a stable securing of the securing element 6 is ensured. A possibly required disassembly of the securing element 6 can be performed by compressing the spreading legs 15, 16 at the backside 25 of the sheet metal shell 3. When doing so, the spreading legs 15, 16 in the recess 12 can be gripped laterally. By compressing the spreading legs 15, 16, the securing element 6 can then be pushed out of the recess 8.

The foam material pad forming the upholstery member 4 is then placed onto the securing elements 6 secured on the sheet metal shell 3. With its two barbs 26, 27 the hook portion 9 secures the foam material pad so as to be safely positioned during transport. The sheet metal shell 3 can then be transported to the subsequent covering process in order to be covered with the upholstery cover 5.

On the upholstery cover 5 connectors 10 are attached by sewing whose locations corresponds to the position of the securing elements 6, respectively. Such a connector 10 is comprised of a non-woven strip or a non-woven thread 28 which at its free end 29 has a securing profile 30 which is comprised of plastic material attached by injection molding. This securing profile 30 of the connector 10 is pressed into a receptacle 32 provided at the upper end 31 of the securing element 6. The receptacle 32 is formed by two snap legs 33, 34 with securing pawls 35 at its ends. The snap legs 33, 34 engage the securing profile 30 and secure it safely. Thus, a direct connection between the upholstery cover 5 and the sheet metal shell 3 is ensured.

It can also be seen especially in FIG. 2 that each snap leg 33, 34 has at its outer side 36 a recess 37 extending transversely to its longitudinal extension and having a stay 38 arranged approximately in the central area.

While specific embodiments of the invention have been shown and described in detail to illustrate the inventive principles, it will be understood that the invention may be embodied otherwise without departing from such principles.

What is claimed is:

1. A backrest of a motor vehicle seat, the backrest comprising:

a sheet metal shell having several cutouts;

an upholstery member arranged on the sheet metal shell;

the upholstery member having securing elements configured to attach the upholstery member to the sheet metal shell;

each one of the securing elements having a fastening leg secured in one of the cutouts of the sheet metal shell;

each one of the securing elements having a hook portion positioned opposite the fastening leg and engaging the upholstery member;

an upholstery cover covering the upholstery member and having connectors each connected to one of the securing elements.

2. The backrest according to claim 1, wherein the sheet metal shell has recesses set back in a direction toward the upholstery member and wherein each one of the cutouts is arranged in one of the recesses.

3. The backrest according to claim 1, wherein each one of the fastening legs is provided with two elastic spreading legs having free ends and further provided with an abutment positioned at a spacing, matching a thickness of the sheet metal shell, opposite the free ends of the spreading legs.

4. The backrest according to claim 3, wherein each of the free ends of the spreading legs has a recess and wherein the recesses face away form one another.

5. The backrest according to claim 1, wherein the hook portion has at least one barb positioned at an angle to the sheet metal shell.

6. The backrest according to claim 1, wherein each one of the securing elements has a receptacle remote from the fastening leg and configured to receive one of the connectors.

7. The backrest according to claim 6, wherein each connector has a securing profile and wherein the securing profile engages the receptacle.

8. The backrest according to claim 6, wherein each one of the receptacles comprises two snap legs, wherein the snap legs have free ends with securing pawls.

9. The backrest according to claim 8, wherein each one of the snap legs has an outer side with a recess extending transversely to a longitudinal extension of the snap leg, wherein the recess comprises a stay arranged in a central area of the recess.

10. The backrest according to claim 1, wherein the connectors are comprised of a non-woven thread having a pointed securing profile made of plastic material.

11. The backrest according to claim 1, wherein the securing elements have a center portion connecting the securing leg and the hook portion and where in the center portion has a cross-shaped cross-section.

* * * * *